United States Patent
Sasahara et al.

(10) Patent No.: US 9,091,756 B2
(45) Date of Patent: Jul. 28, 2015

(54) RECEIVING METHOD AND RECEIVING APPARATUS

(71) Applicant: Seiko Epson Corporation, Shinjuku-ku (JP)

(72) Inventors: Hideo Sasahara, Matsumoto (JP); Kiyotaka Muraki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 133 days.

(21) Appl. No.: 13/776,531

(22) Filed: Feb. 25, 2013

(65) Prior Publication Data
US 2013/0229304 A1 Sep. 5, 2013

(30) Foreign Application Priority Data
Mar. 2, 2012 (JP) .................. 2012-046254

(51) Int. Cl.
*G01S 19/20* (2010.01)
*G01S 19/24* (2010.01)

(52) U.S. Cl.
CPC ............. *G01S 19/20* (2013.01); *G01S 19/243* (2013.01)

(58) Field of Classification Search
CPC .............................. G01S 19/20; H04L 1/0061
USPC .............................. 714/819, 709; 342/357.58
See application file for complete search history.

(56) References Cited

U.S. PATENT DOCUMENTS

| 7,385,929 B1* | 6/2008 | McFarland et al. ........... 370/243 |
| 7,545,317 B2 | 6/2009 | Han |
| 7,792,222 B2 | 9/2010 | Tang et al. |
| 2010/0060516 A1* | 3/2010 | Onda .................... 342/357.02 |
| 2011/0187596 A1* | 8/2011 | Rao et al. ................ 342/357.66 |

FOREIGN PATENT DOCUMENTS

| JP | 2008-541629 A | 11/2008 |
| WO | 2006/122291 A2 | 11/2006 |

* cited by examiner

*Primary Examiner* — Albert Decady
*Assistant Examiner* — Kyle Vallecillo
(74) *Attorney, Agent, or Firm* — Kilpatrick Townsend & Stockton LLP

(57) ABSTRACT

In a baseband process circuit unit, a demodulation unit demodulates a received satellite signal which carries a navigation message to obtain a demodulated data. Further, an error bit detection unit detects an error bit from among the demodulated data using a parity code included in the demodulated data. An inconsistent bit detection unit detects an inconsistent bit by comparing the demodulated data with prescribed comparison data. An adoption determination unit determines whether or not to adopt the demodulated data, based on a difference between the error bit and the inconsistent bit. In addition, a correction unit corrects the demodulated data, in a case where the demodulated data is determined to be adopted by the adoption determination unit.

8 Claims, 8 Drawing Sheets

| WORD IDENTIFICATION INFORMATION (232A) | WORD TYPE (232B) | STORED PARAMETER (STORED BIT) (232C) |
|---|---|---|
| SF2 WORD1 | — | — |
| SF2 WORD2 | — | — |
| SF2 WORD3 | SINGLE | $C_{rs}(B9 \sim B24)$ |
| SF2 WORD4 | COMPLEX | $\Delta n(B1 \sim B16)$<br>$M_0(B17 \sim B24)$ |
| SF2 WORD5 | SINGLE | $M_0(B1 \sim B24)$ |
| SF2 WORD6 | COMPLEX | $C_{uc}(B1 \sim B16)$<br>$e(B17 \sim B24)$ |
| SF2 WORD7 | SINGLE | $e(B1 \sim B24)$ |
| SF2 WORD8 | COMPLEX | $C_{us}(B1 \sim B16)$<br>$(A)^{1/2}(B17 \sim B24)$ |
| SF2 WORD9 | SINGLE | $(A)^{1/2}(B1 \sim B24)$ |
| SF2 WORD10 | SINGLE | $t_{oe}(B1 \sim B16)$ |
| ⋮ | ⋮ | ⋮ |

|  | PARAMETER A | | PARAMETER B | |
|---|---|---|---|---|
|  | B1 | B16 | B17 | B24 |
| ERROR BIT | ——— B5 ——————————————— | | ——————————— | |
| INCONSISTENT BIT | ——— B5 ——————— B13 ——— | | ——————————— | |

 ADOPTION

FIG. 8B

|  | PARAMETER A | | PARAMETER B | |
|---|---|---|---|---|
|  | B1 | B16 | B17 | B24 |
| ERROR BIT | ——— B5 ——————————————— | | ——————————— | |
| INCONSISTENT BIT | ————— B7 ——————— B13 ——— | | ——————————— | |

 NON-ADOPTION

FIG. 8C

|  | PARAMETER A | | PARAMETER B | |
|---|---|---|---|---|
|  | B1 | B16 | B17 | B24 |
| ERROR BIT | ——— B5 ——————————————— | | ——————————— | |
| INCONSISTENT BIT | ——— B5 — B7 ——— B10 ——— B13 ——— B16 | | ——————————— | |

 NON-ADOPTION

FIG. 8D

|  | PARAMETER A | | PARAMETER B | |
|---|---|---|---|---|
|  | B1 | B16 | B17 | B24 |
| ERROR BIT | ——— B5 ——————————————— | | ——————————— | |
| INCONSISTENT BIT | — B3 — B5 ——————— B13 ——— | | ——————————— | |

 NON-ADOPTION

FIG. 8E

|  | PARAMETER A | | PARAMETER B | |
|---|---|---|---|---|
|  | B1 | B16 | B17 | B24 |
| ERROR BIT | ——— B5 ——————————————— | | ——————————— | |
| INCONSISTENT BIT | ——— B5 ——————— B13 ——— | | ——— B20 ——— | |

 NON-ADOPTION

RECEIVING METHOD AND RECEIVING APPARATUS

This application claims priority to Japanese Patent Application No. 2012-046254, filed Mar. 2, 2012, the entirety of which is hereby incorporated by reference.

BACKGROUND

1. Technical Field

The present invention relates to a method of receiving a satellite signal which carries a navigation message therewith, and the like.

2. Related Art

As a positioning system using a positioning signal, GPS (Global Positioning System) is widely known and has been adopted in a receiving apparatus which is built into a mobile phone, a car navigator, and the like. GPS obtains the positions of a plurality of GPS satellites, a pseudo distance from each of the GPS satellites to the receiving apparatus, and the like using the measured time of a GPS receiver and finally calculates the position thereof.

The GPS satellite transmits information on satellite orbits, times, and the like including navigation messages at a bit rate of 50 bps (bits per second). A single navigation message is configured of one master frame, and the one master frame is configured of 25 frames, each of which is configured of 1500 bits. In order to acquire all of the navigation messages, it is necessary to receive 25 frames configuring the master frame, which takes 12.5 minutes.

The environment in which the GPS satellite signal is received varies depending on the position of the receiving apparatus, and the like. In an environment with a weak electric field, the signal intensity of the received signal is weak. Accordingly, the variation (bit transition) in a bit value of the navigation message cannot be accurately detected and thus there is a possibility that an error may occur in demodulating the received signal. Therefore, a technique determining whether or not the demodulation of the received signal is correct is disclosed (for example, refer to JP-T-2008-541629).

JP-T-2008-541629 discloses an error detection which performs an inspection for each word included in each subframe of the navigation message in accordance with a previously regulated operational equation using a parity bit of six bits stored at the end of the word. However, it is inefficient that the received data is discarded due to a demodulation error in one bit. In such a case, a lot of time is needed to collect parameters which are required to calculate the satellite orbits. Therefore, there is a problem in that the Time to First Fix (TTFF) increases.

SUMMARY

An advantage of some aspects of the invention is to provide a new technique for restoring the received data in which an error occurs in demodulating.

A first aspect of the invention is directed to a receiving method including: receiving a satellite signal which carries a navigation message; demodulating the received satellite signal to obtain a demodulated data; detecting an error bit from among the demodulated data using an error detection code included in the demodulated data; detecting a inconsistent bit by comparing the demodulated data with prescribed comparison data; determining whether or not to adopt the demodulated data, based on a difference between the error bit and the inconsistent bit; and correcting the demodulated data, in a case where it is determined to adopt the demodulated data by the determination.

As another aspect, the first aspect of the invention may be configured as a receiving apparatus including: a receiving unit that receives a satellite signal which carries a navigation message; a demodulation unit that demodulates the received satellite signal to obtain a demodulated data; an error bit detection unit that detects an error bit from among the demodulated data using an error detection code included in the demodulated data; an inconsistent bit detection unit that detects an inconsistent bit by comparing the demodulated data with prescribed comparison data; an adoption determination unit that determines whether or not to adopt the demodulated data, based on a difference between the error bit and the inconsistent bit; and a correction unit that corrects the demodulated data, in a case where it is determined to adopt the demodulated data by the adoption determination unit.

According to the first aspect and the like of the invention, the signal which receives the satellite signal which carries the navigation message therewith is demodulated, and an error bit is detected from among the demodulated data using an error detection code included in the demodulated data. If the error bit could be detected, the demodulated data can be corrected. However, in a case where the error detection code cannot be correctly demodulated, and the like, it cannot be denied that there is a possibility that the error bit detection itself may be incorrect. Therefore, the demodulated data is compared with the prescribed comparison data and the inconsistent bit is detected and is determined whether or not to be adopted the demodulated data is determined, based on difference and similarity between the error bit and the inconsistent bit. Then, in a case where it is determined to be adopted, the demodulated data is corrected. Thereby, it is possible to restore the received data in which the demodulation error occurs by an appropriate determination of the adoption of the demodulated data.

As a second aspect of the invention, the receiving method according to the first aspect of the invention may be configured such that the demodulated data is comprises word data for each predetermined transport data unit following a data format of the navigation message, the detecting of the error bit includes detecting the error bit for each word data, the detecting of the inconsistent bit includes comparing the demodulated data with the comparison data with respect to word data in which an orbit calculation parameter is stored, and the determining whether or not to adopt the demodulated data includes determining whether or not to adopt the word data in which the orbit calculation parameter is stored.

According to the receiving method of the second aspect of the invention, the error bit detection is performed using word data as one process unit. Further, in the word data in which the orbit calculation parameter is stored, the demodulated data is compared with the comparison data, and thereby it is possible to determine whether or not to adopt the word data in which the orbit calculation parameter is stored.

As a third aspect of the invention, the receiving method according to the second aspect of the invention may be configured such that the determining whether or not to adopt the demodulated data includes determining to adopt the word data in a bit portion of the orbit calculation parameter within the word data, if the error bit and the inconsistent bit in a prescribed determination bit portion are consistent, even in a case where the error bit and the inconsistent bit are different in a bit portion other than the determination bit portion.

According to the receiving method of the third aspect of the invention, in the bit portion of the orbit calculation parameter within the word data, if the error bit and the inconsistent bit in the prescribed determination bit portion be consistent, even in a case where the error bit and the inconsistent bit are different from each other in a portion other than the determination bit portion, the word data is determined to be adopted. Thereby, for example, if the error bit and the inconsistent bit are consistent in a bit portion in which a higher order digit of the orbit calculation parameter is stored, the word data can be determined to be adopted.

As a fourth aspect of the invention, the receiving method according to the second aspect of the invention may be configured such that the determining whether or not to adopt the demodulated data includes the determining not to adopt the word data in a case where the highest order inconsistent bit among the inconsistent bits is not the error bit in a bit portion of the orbit calculation parameter within the word data.

According to the receiving method of the fourth aspect of the invention, in the bit portion of the orbit calculation parameter within the word data, in a case where the highest order inconsistent bit among the inconsistent bits is not the error bit, the word data is determined not to be adopted. Thereby, for example, in the bit portion of the orbit calculation parameter within the word data, in a case where the inconsistent bit which is not in the error bit is present at higher order bit than the error bit, it is possible to determine not to adopt the word data.

As a fifth aspect of the invention, the receiving method according to the third or fourth aspect of the invention may be configured such that the determining whether or not to adopt the demodulated data includes performing determination using a bit portion of each orbit calculation parameter, in a case where a plurality of the orbit calculation parameters is included within the word data.

According to the receiving method of the fifth aspect of the invention, accuracy of the determination for adoption can be improved by performing the determination for adoption using the bit portion of each orbit calculation parameter, in a case where a plurality of the orbit calculation parameters is included in the word data.

As a sixth aspect of the invention, the receiving method according to the second aspect of the invention may be configured such that the determining of the adoption includes performing the determination by changing conditions of determination whether or not to adopt the word data, depending on the orbit calculation parameter which is stored in the word data.

According to the receiving method the sixth aspect of the invention, it is possible to perform the determination for adoption smoothly by changing conditions of determination whether or not to adopt the word data, depending on the orbit calculation parameter which is stored in the word data.

As a seventh aspect of the invention, the receiving method according to any of the first to sixth aspects of the invention may be configured such that the receiving method further includes generating the comparison data using a long term prediction ephemeris.

The long term prediction ephemeris is a prediction ephemeris which has a long effective term compared to the prediction ephemeris which is carried with the satellite signal. According to the receiving method of the seventh aspect of the invention, the comparison data which is appropriate to compare the demodulated data can be simply generated using the long term prediction ephemeris.

BRIEF DESCRIPTION OF THE DRAWINGS

The invention will be described with reference to the accompanying drawings, wherein like numbers reference like elements.

FIG. 4 is a diagram illustrating an example of a data configuration of a word definition data.

FIGS. 8A to 8E are diagrams for explaining specific examples of a demodulated data adoption determination.

DESCRIPTION OF EXEMPLARY EMBODIMENTS

Hereinafter, an example of a preferred embodiment which is adopted according to the invention is described. In the above embodiment, GPS (Global Positioning System) which is a kind of satellite position measurement system is adopted thereto. As an example of the electronic equipment which includes a receiver that receives a GPS satellite signal which carries a navigation message therewith, an embodiment of a case where the invention is adopted in a mobile phone is described. However, it is needless to say that the embodiments that the invention can be adopted are not limited to the embodiments described below.

1. Configuration 1-1. Configuration of Mobile Phone

Figure 1:
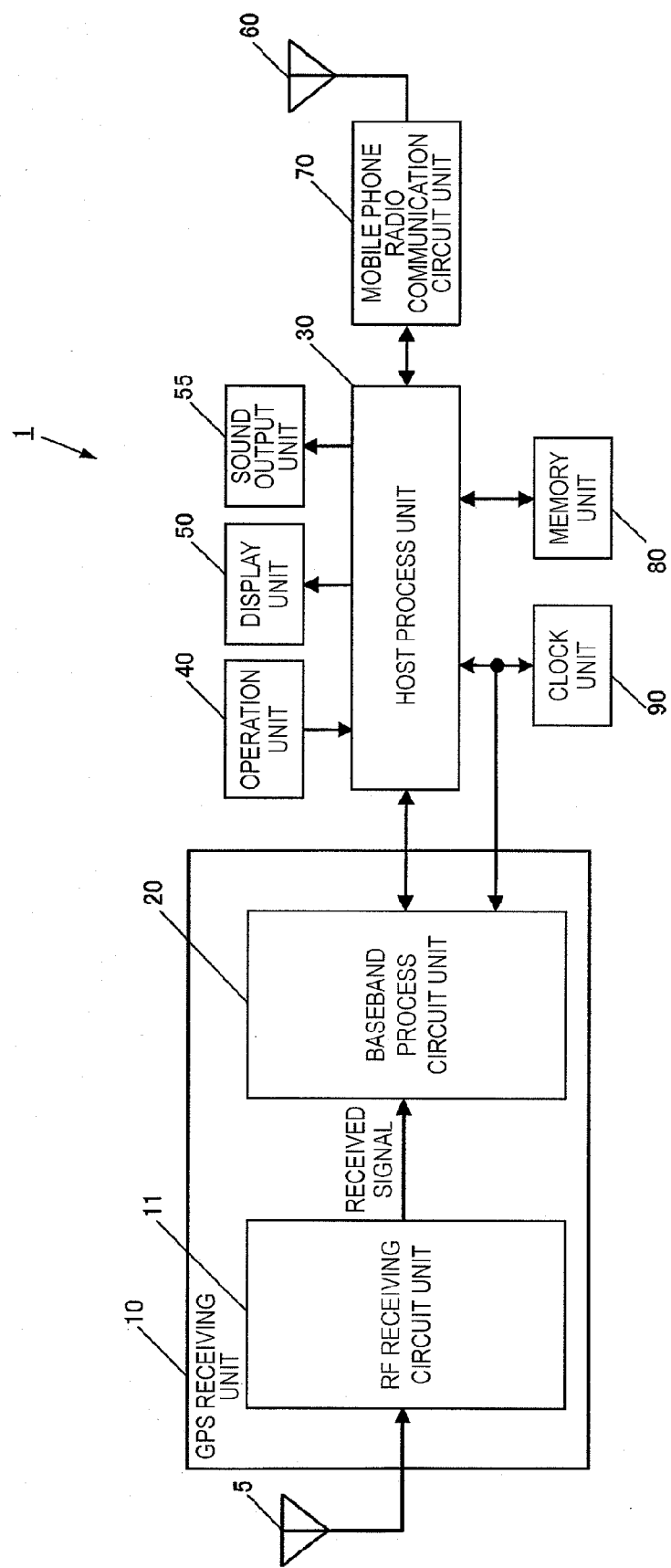
FIG. 1 is a diagram illustrating an example of a functional configuration of a mobile phone.

FIG. 1 is a block diagram illustrating an example of the functional configuration of the mobile phone 1 according to the present embodiment. The mobile phone 1 is configured of a GPS antenna 5, a GPS receiving unit 10, a host process unit 30, an operation unit 40, a display unit 50, a sound output unit 55, a mobile phone antenna 60, a mobile phone radio communication circuit unit 70, a memory unit 80 and a timepiece unit 90.

The GPS antenna 5 is an antenna which receives a RF (Radio Frequency) signal including GPS satellite signals transmitted from the GPS satellite and outputs the received signal to the GPS receiving unit 10. The GPS satellite signal is a communication signal with 1.57542 [GHz] modulated by CDMA (Code Division Multiple Access) method which is known as a spectrum spread method by a C/A (Coarse and Acquisition) code which is a kind of spread code. The C/A code is a pseudo-random noise code having a repetition period of 1 ms with a code length 1023 chip as 1PN frame and is a unique code in the respective GPS satellite.

The GPS receiving unit 10 is a circuit or device that calculates a position of the mobile phone 1, based on signal output from the GPS antenna 5 and is a so-called functional block corresponding to the GPS receiver. In the present embodiment, the GPS receiving unit 10 corresponds to a receiving apparatus.

The GPS receiving unit 10 is configured of a RF receiving circuit unit 11 and a baseband process circuit unit 20. Further, the RF receiving circuit unit 11 and the baseband process circuit unit 20 can be respectively made of a separate LSI (Large Scale Integration) or a single chip.

The RF receiving circuit unit 11 is a circuit receiving the RF signal and corresponds to a receiving unit receiving the GPS satellite signal which carries a navigation message therewith. As the circuit configuration of the RF receiving circuit unit 11, a receiving circuit in which the RF signal output from the GPS antenna 5 is converted to a digital signal by an A/D converter and processes the digital signal may be preferably configured. Further, it is preferably configured such that the RF signal output from the GPS antenna 5 is processed as an analog signal as it is and finally, the digital signal obtained by an A/D conversion is output to the baseband process circuit unit 20.

In a case of the latter, for example, the following RF receiving circuit unit 11 may be configured. In other words, by dividing or multiplying a predetermined oscillation signal, an oscillation signal for multiplying RF signal is generated. Then, by multiplying the generated oscillation signal by the RF signal output from the GPS antenna 5, the RF signal is down-converted into an intermediate frequency signal (hereinafter, referred to as a "IF signal"). Then, the IF signal is amplified, and the like, and thereafter, is converted to the digital signal by the A/D convertor and thereafter, is output to the baseband process circuit unit 20.

The baseband process circuit unit 20 performs a carrier removal, a correlation operation, and the like with regard to the received signal of the GPS satellite signal which is received by the RF receiving circuit unit 11 and captures the GPS satellite signal. Then, by using the measured time information, the satellite orbit information, and the like extracted from the GPS satellite signal, the position of the mobile phone 1 or a clock error is calculated.

The host process unit 30 is a processor that performs overall control of each unit of the mobile phone 1 according to various programs such as a system program which is stored in the memory unit 80 and is configured of the processor such as a CPU (Central Processing Unit). The host process unit 30 displays, based on position coordinates acquired from the baseband process circuit unit 20, a map pointing a current position on the display unit 50 or uses the position coordinates to process the various applications.

The operation unit 40 is an input device configured of touch panels, button switches, and the like, for example, and outputs the signal obtained by pressing keys or buttons to the host process unit 30. By operating the operation unit 40, various instructions such as call requests or mail sending and receiving requests, various application running requests, and position calculation requests are input.

The display unit 50 is a display device configured of an LCD (Liquid Crystal Display) and the like, and performs various displays, based on the display signal output from the host process unit 30. In the display unit 50, a position display screen, time information, and the like are displayed.

The sound output unit 55 is a sound output device configured of a speaker, and the like, and outputs various sound outputs, based on the sound output signal output from the host process unit 30. Sounds such as voices during calls, guidance voices related to various applications, and the like are output from the sound output unit 55.

The mobile phone antenna 60 is an antenna that transmits and receives the mobile phone radio signal between the mobile phone 1 and the radio base stations installed by a communication service provider of the mobile phone 1.

The mobile phone radio communication circuit unit 70 is a communication circuit unit of the mobile phone configured of a RF conversion circuit, the baseband process circuit, and the like and transmitting and receiving in calling and e-mailing is realized by performing the modulation, demodulation, and the like of mobile phone radio signal.

The memory unit 80 is configured of storage devices such as a ROM (Read Only Memory), a flash ROM, a RAM (Random Access Memory), and the like, and stores a system program for controlling the mobile phone 1, various programs for executing various application processes, data or the like, which are to be performed by the host process unit 30.

The clock unit 90 is a timepiece incorporated in the mobile phone 1, and is configured of a quartz crystal oscillator which is configured of a quartz crystal resonator and an oscillator circuit, and the like. The measured time of the timepiece unit 90 is output to the baseband process circuit unit 20 and the host process unit 30 at any time. The measured time of the timepiece unit 90 is corrected, based on the clock error calculated by the baseband process circuit unit 20.

1-2. Circuit Configuration of Baseband Process Circuit Unit

Figure 2:
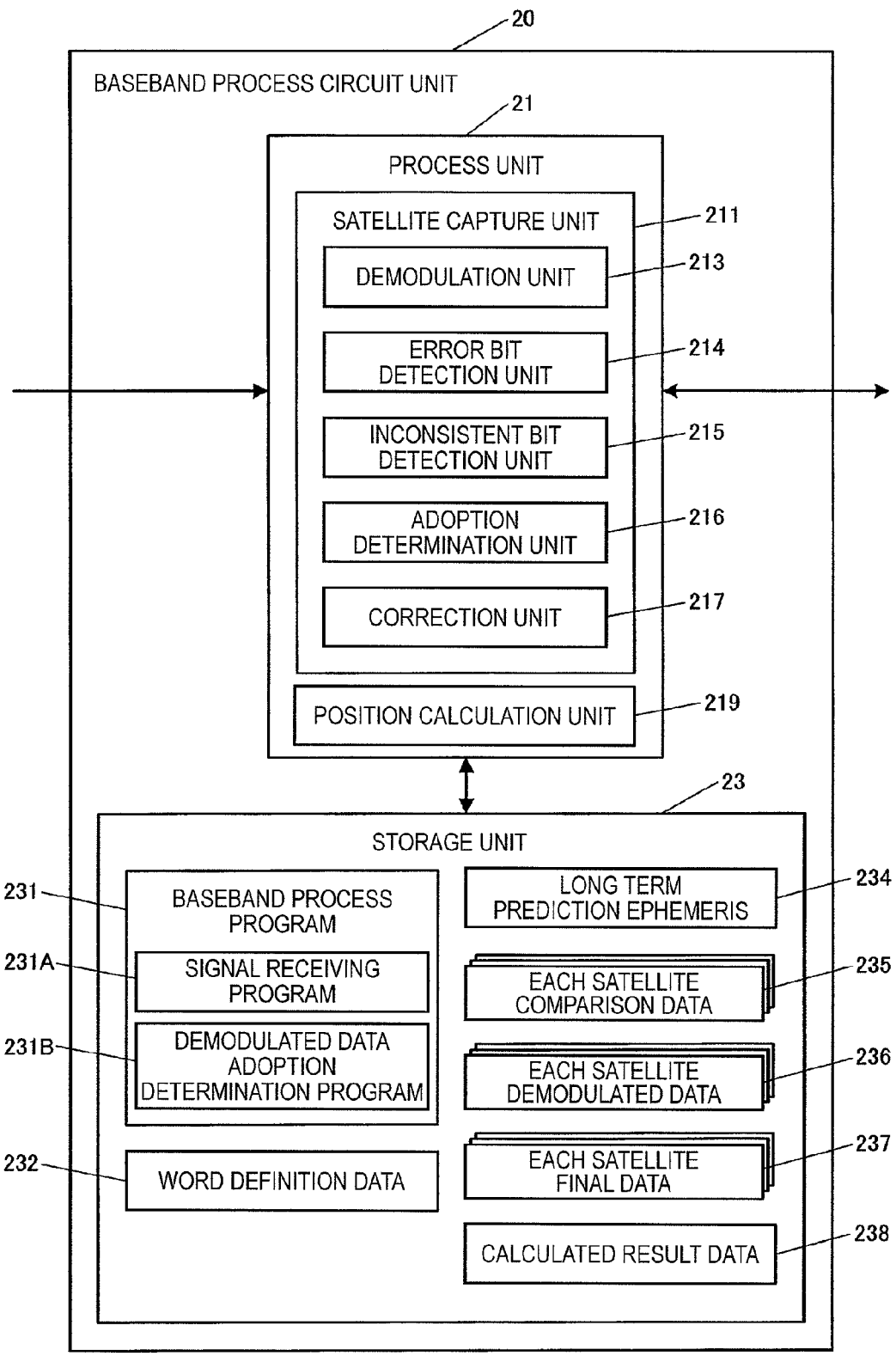
FIG. 2 is a diagram illustrating an example of a circuit configuration of baseband processing circuit unit.

FIG. 2 is a diagram illustrating an example of the circuit configuration of the baseband process circuit unit 20 and is a diagram with a circuit block related to the present embodiment on focus. The baseband process circuit unit 20 includes a process unit 21 and a storage unit 23 as a main configuration.

The process unit 21 is a controller and an operation device that overall controls various functional units of the baseband process circuit unit 20 and is configured of a processor such as a CPU or DSP (Digital Signal Processor), and the like. The process unit 21 has a satellite capture unit 211 and a position calculation unit 219 as a main functional unit.

The satellite capture unit 211 is a functional unit in which captures the GPS satellite (GPS satellite signal). Specifically, with respect to the digitalized received signal output from the RF receiving circuit unit 11, the satellite capture unit 211 executes a digital signal process such as the carrier removal, a correlation operation, and the like, and captures the GPS satellite, based on the result of process of the digitalized GPS signal.

In the present embodiment, the satellite capture unit 211 includes a demodulation unit 213, an error bit detection unit 214, an inconsistent bit detection unit 215, an adoption determination unit 216 and a correction unit 217. However, these functional units are merely described as examples according to one embodiment. Therefore not all of such functional units are necessarily required. Any functional unit other than these may be included as an essential component.

The demodulation unit 213 demodulates the received signal of the GPS satellite signal received by the RF receiving circuit unit 11. In the present embodiment, the data demodulated by the demodulation unit 213 is referred to as "demodulated data". In a case where the received signal is correctly demodulated, the demodulated data becomes data of the navigation message. The navigation message carries data therewith by the unit of the transport data which is referred to as a word. The word is a kind of predetermined transport data unit, following a data format of the navigation message. In the present embodiment, the data demodulated by a word unit among the demodulated data is referred to as "demodulated word data" and described.

With regard to the demodulated word data, firstly, a parity check process is performed.

In the parity check process, in accordance with a previously regulated operational equation, the parity check is performed with regard to the demodulated word data. Further, the operational equation per se of the parity check regulated in the GPS is known. Therefore, description thereof is omitted.

With regard to the demodulation word data which has an error as a result of the parity check process, the error bit detection is performed by the error bit detection unit 214. The error bit detection unit 214 detects the error bit within the demodulated data using an error detection code included in the demodulated data.

Specifically, if the demodulation error does not occur in the demodulated word data, value of the parity bit (hereinafter, referred to as "demodulated parity bit") included in the demodulated word data and value of the parity bit (hereinafter, referred to as "operation parity bit") operated in accordance with the operational equation to perform the parity check are consistent. In a case where the demodulation error occurs, they are not consistent.

However, if the error occurs in one bit, it is possible to specify the bit which the demodulation error occurs using a Hamming code, which is a kind of check code. The error bit detection unit 214 specifies (detects) the error bit in such a manner. Further, this detection method is also a method regulated in the GPS.

Further, with regard to the demodulated word data which has an error as a result of the parity check process, the inconsistent bit detection is performed by the inconsistent bit detection unit 215. The inconsistent bit detection unit 215 detects the inconsistent bit by comparing the demodulated data with the comparison data which is stored in the storage unit 23.

The error bit detection unit 214 and the inconsistent bit detection unit 215 perform the detection of the error bit and the inconsistent bit for an object that is the demodulated word data corresponding to a word (hereinafter, referred to as "orbit calculation parameter storing word") in which a parameter (hereinafter, referred to as "orbit calculation parameter") that is required to calculate the orbit of the GPS satellite is stored.

As the parameter for calculating the orbit, for example, 16 parameters such as "$C_{rs}$", "$\Delta_n$", "$M_0$", "$C_{uc}$", "e", "$C_{us}$", "$(A)^{1/2}$", "$t_{oe}$", "$C_{ic}$", "$\Omega_0$", "$C_{is}$", "$i_0$", "$C_{rc}$", "$\omega$", "OMEGADOT" and "IDOT" can be included. Such parameters are stored in the third word to the tenth word of the second subframe and the third subframe.

Figure 3A:
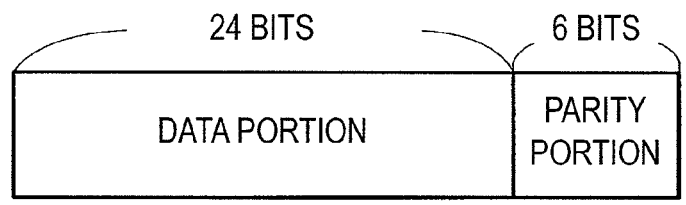
FIGS. 3A to 3D are diagrams for explaining words storing orbit calculation parameters.

FIGS. 3A to 3D are diagrams for explaining the orbit calculation parameter storing word. As shown in FIG. 3A, each word of the navigation message is configured of a data unit with 24 bits and a parity unit with 6 bits. The orbit calculation parameter storing data word includes a word in which (hereinafter, referred to as "single word") in which one orbit calculation parameter is stored and a word (hereinafter, referred to as "complex word") in which a plurality of orbit calculation parameter is stored.

Figure 3B:
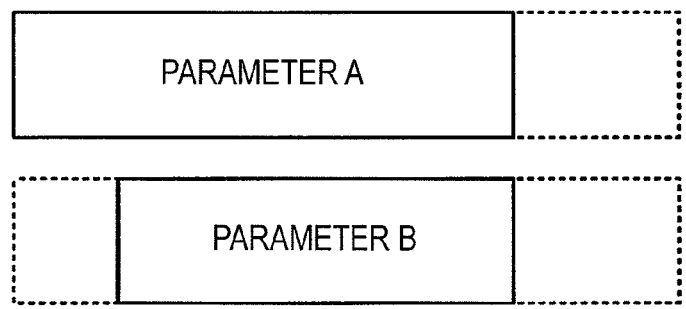

The single word includes, as shown in FIG. 3B, a word in which one orbit calculation parameter (parameter A) is stored over the entire data portion and a word in which one orbit calculation parameter (parameter B) is stored in a portion thereof.

Figure 3C:

On the other hand, as shown in FIG. 3C, in the complex word, two kinds of orbit calculation parameters (parameter C and parameter D) are stored.

Figure 3D:
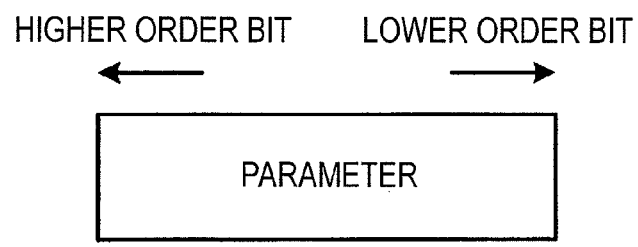

In the present embodiment, as shown in FIG. 3D, in the parameters stored in the single word and complex word, bits at the leading side thereof are described as higher order bits and bits at the end side thereof are described as lower order bits. In the higher order bits, values from the higher order digit are stored, and in the lower order bits, values from the lower order digit are stored.

Referring back to FIG. 2, the adoption determination unit 216 determines whether or not to adopt the demodulated data, based on the difference and similarity between the error bit detected by the error bit detection unit 214 and the inconsistent bit detected by the inconsistent bit detection unit 215. In the present embodiment, the adoption determination unit 216 determines whether or not to adopt the demodulated data by the word unit.

The correction unit 217 corrects the demodulated data, in a case where the demodulated data is determined to be adopted by the adoption determination unit 216. In the present embodiment, the correction unit 217 corrects the demodulated data by the word unit.

The position calculation unit 219 calculates the position (position coordinates) of the mobile phone 1 and the clock error (clock bias), by performing a predetermined position calculation process using a final data acquired as a result of demodulation for each of captured satellites and measurement information acquired for each of captured satellites. The position calculation process can be realized, for example, by using a process adopting a least square method, Kalman filter, or the like.

The storage unit 23 stores the system program of baseband process circuit unit 20 or various functions such as the satellite capture function, the position calculation function, data, and the like. Further, the storage unit 23 has a work area which temporarily stores data, process results, and the like when the various processes are processed.

Figure 5:
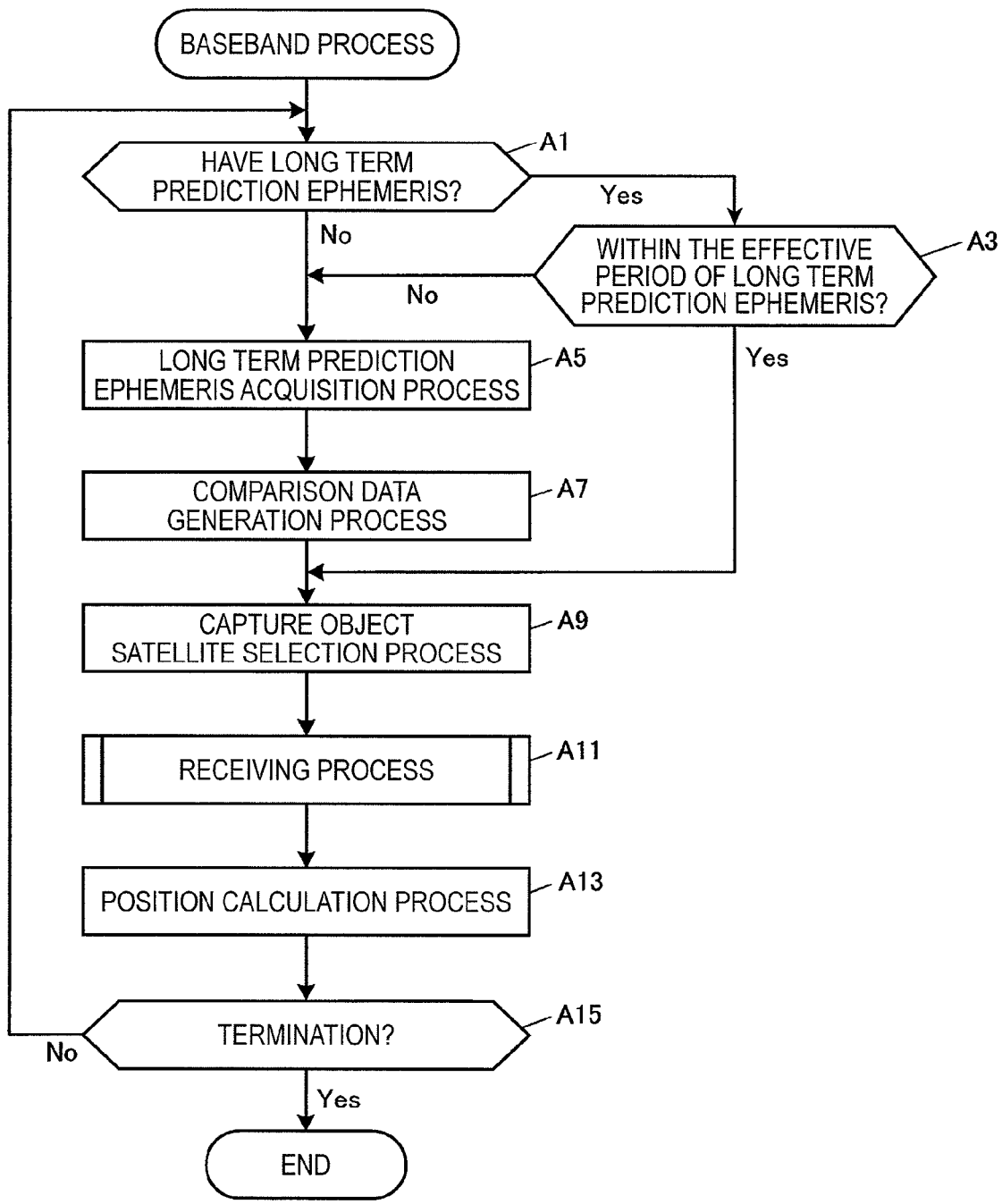
FIG. 5 is a flowchart illustrating a baseband processing flow.

The storage unit 23 also stores, as a program, the baseband process program 231 which is read out by the process unit 21, and is executed as the baseband process (refer to FIG. 5). The baseband process program 231 includes, as a subroutine, a receiving program 231A which is executed as a receiving process (refer to FIG. 6) and a demodulated data adoption determination program 231B which is executed as the demodulated data adoption determination process (refer to FIG. 7). A description of these processes will be explained in detail below using the flowchart.

Further, the storage unit 23 stores, as a main data, a word definition data 232, a long term prediction ephemeris 234, each item of the satellite comparison data 235, each item of the satellite demodulated data 236, each item of the satellite final data 237 and a calculated result data 238.

The word definition data 232 is a data which sets the word information that is the transport data unit of the navigation message, and an example of data configuration thereof is shown in FIG. 4. In the word definition data 232, word identification information 232A, a word type 232B, and a stored parameter 232C are stored in association with each other.

The word identification information 232A is information for uniquely identifying each word, and for example, the identification information of a sub-frame ID and a word ID in association with each other is set.

The word type 232B is a kind of word, and is set to any one of "single" indicating the single word and "complex" indicating the complex word. However, the word in which the orbit calculation parameter is not stored is set to "none".

The stored parameter 232C is set to the orbit calculation parameter and the stored bit which are stored in the word in association with each other.

The long term prediction ephemeris 234 is data that a prediction ephemeris made during a predetermined period for each of GPS satellites is stored. The normal prediction ephemeris generally has a short effective period which is around two to four hours. On the contrary, the long term prediction ephemeris 234 stores, for example, parameter values of the prediction ephemeris made over a long period of two to seven days for each of GPS satellites. It is possible to adopt a configuration such that the long term prediction ephemeris 234 is downloaded periodically from the server performing the generation and provision of the long term prediction ephemeris 234 by connecting the mobile phone 1 to the Internet, for example.

Each item of the satellite comparison data 235 is the comparison data used when the inconsistent bit detection unit 215 detects the inconsistent bit and is stored for each of GPS satellites. In the present embodiment, the process unit 21 generates the comparison data for each of GPS satellites using the long term prediction ephemeris 234 previously acquired. The comparison data is generated as the consistent format data, following a data format of the navigation message, so as to be able to compare with the demodulated data by the word unit and bit unit.

Each item of the satellite demodulated data 236 is data that the demodulated data demodulated by the receiving unit is stored for each of GPS satellites.

Each item of the satellite final data 237 is data that a final demodulated data used for performing the position calculation process is stored for each of GPS satellites. In a case where the correction by the correction unit 217 is performed, the corrected data is stored therein.

The calculated result data 238 is data obtained as a calculation result by the position calculation process performed by the position calculation unit 219, in which the calculated position of the mobile phone or the clock error is included.

2. Flow of Process

FIG. 5 is a flowchart illustrating the flow of baseband process which is executed by the process unit 21 according to the baseband process program 231 which is stored in the storage unit 23.

First, the process unit 21 determines whether or not the long term prediction ephemeris 234 is reserved (Step A1), in a case where it is determined to be reserved (Step A1; Yes), the process unit determines whether or not the current time is within the effective period of the long term prediction ephemeris 234 (Step A3). In a case where it is determined to be within the effective period (Step A3; Yes), the process is advanced to the step A9.

In the step A1, in a case where it is determined that the long term prediction ephemeris 234 is not reserved (Step A1; No) or in the step A3, in a case where it is determined not within the effective period of the long term prediction ephemeris 234 (Step A3; No), the process unit 21 performs the long term prediction ephemeris acquisition process (Step A5). Specifically, for example, a network is connected to the predetermined server, and then the long term prediction ephemeris 234 is downloaded from the server and stored in the storage unit 23.

Next, the process unit 21 performs the comparison data generating process (Step A7). Specifically, by using the long term prediction ephemeris 234 acquired in step A5, the comparison data is generated for each of GPS satellites following a data format of the navigation message.

Thereafter, the process unit 21 performs a capture object satellite selection process (Step A9). Specifically, in a current day and time being measured by the timepiece unit 90, the GPS satellite located in the sky of the prescribed reference position is determined using the satellite orbit data such as an almanac or the long term prediction ephemeris 234 and is selected as the capture object satellite. The reference position can be set, for example, by a method in which in a case of the first time the position calculation is performed after power-on, assumes a position acquired from the server by a so-called server assist, in a case of a second time of the position calculation, assumes to be a latest calculation position, and the like.

Next, the process unit 21 performs the receiving process according to a receiving program 231A stored in the storage unit 23 (Step A11).

Figure 6:
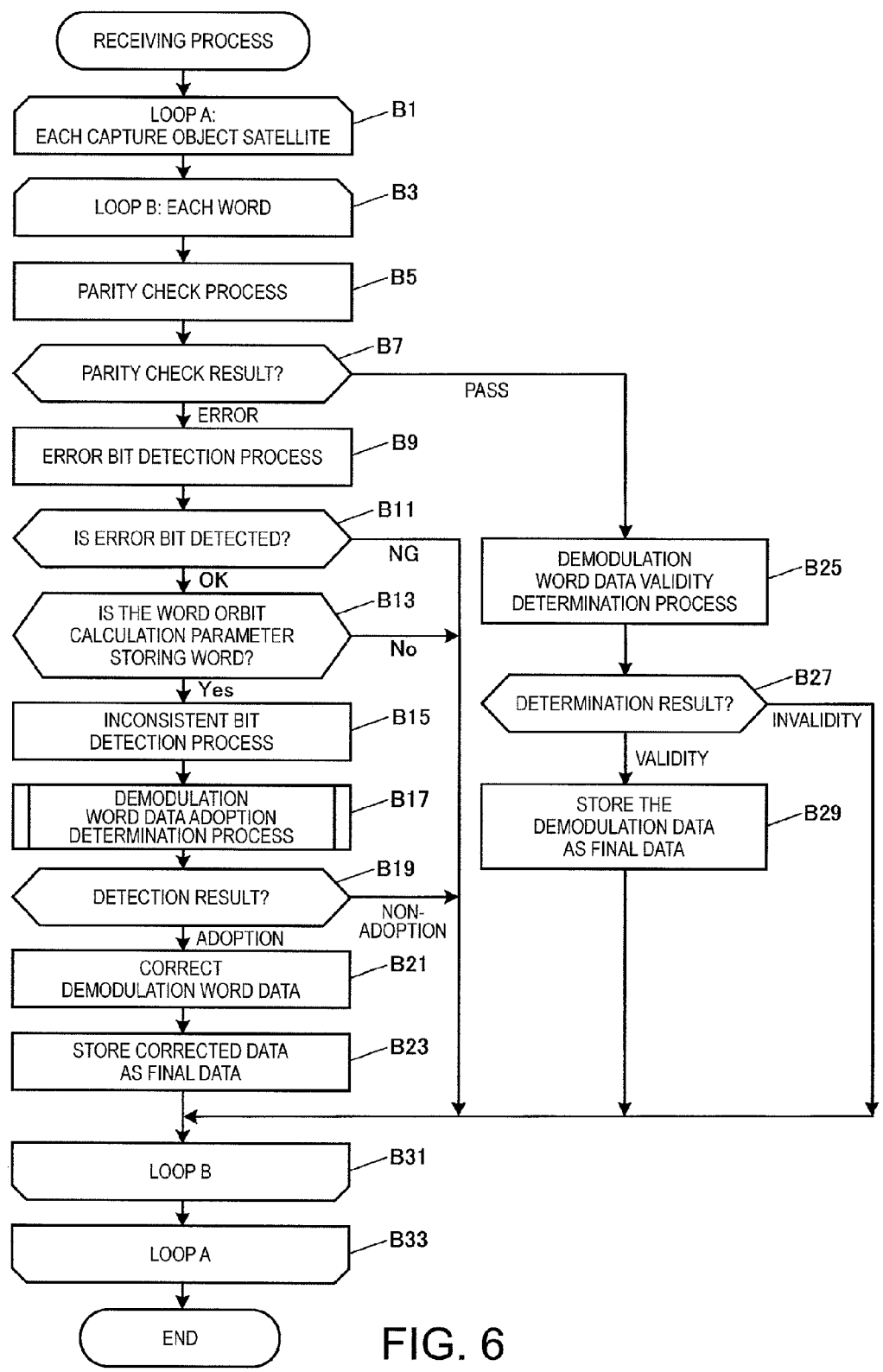
FIG. 6 is a flowchart illustrating a receiving process flow.

FIG. 6 is a flowchart illustrating flow of the receiving process.

The process unit 21 performs the process of a loop A for each of the capture object satellites as an object to process (Step B1 to Step B33). In the process of the loop A, the process unit 21 performs the process of a loop B for each word in the navigation message as an object to process (Step B3 to Step B31).

In the process of the loop B, the process unit 21 performs the parity check process for the demodulation word data which the respect word is demodulated by the demodulation unit 213 (Step B5). In a case where the result of the parity check is an error (Step B7; ERROR), the error bit detection unit 214 performs the error bit detection process for the demodulation word data (Step B9). In a case where the error bit can be detected by the error bit detection process (Step B11; OK), the process unit 21 determines whether the word is an orbit calculation parameter storing word or not (Step B13).

If the word is determined to be the orbit calculation parameter storing word (Step B13; Yes), the inconsistent bit detection unit 215 performs the inconsistent bit detection process (Step B15). Specifically, the demodulation word data is compared with the comparison word data from the capture object satellites which are stored in each item of the satellite comparison data 235. At this time, with reference to the word definition data 232, the orbit calculation parameters which are stored in the word are compared each other by the bit unit. Then, a bit that value obtained as a result of the comparison is not consistent is detected as an inconsistent bit.

Next, the adoption determination unit 216 performs the demodulation word data adoption determination process according to the demodulated data adoption determination program 231B which is stored in the storage unit 23 (Step B17).

Figure 7:
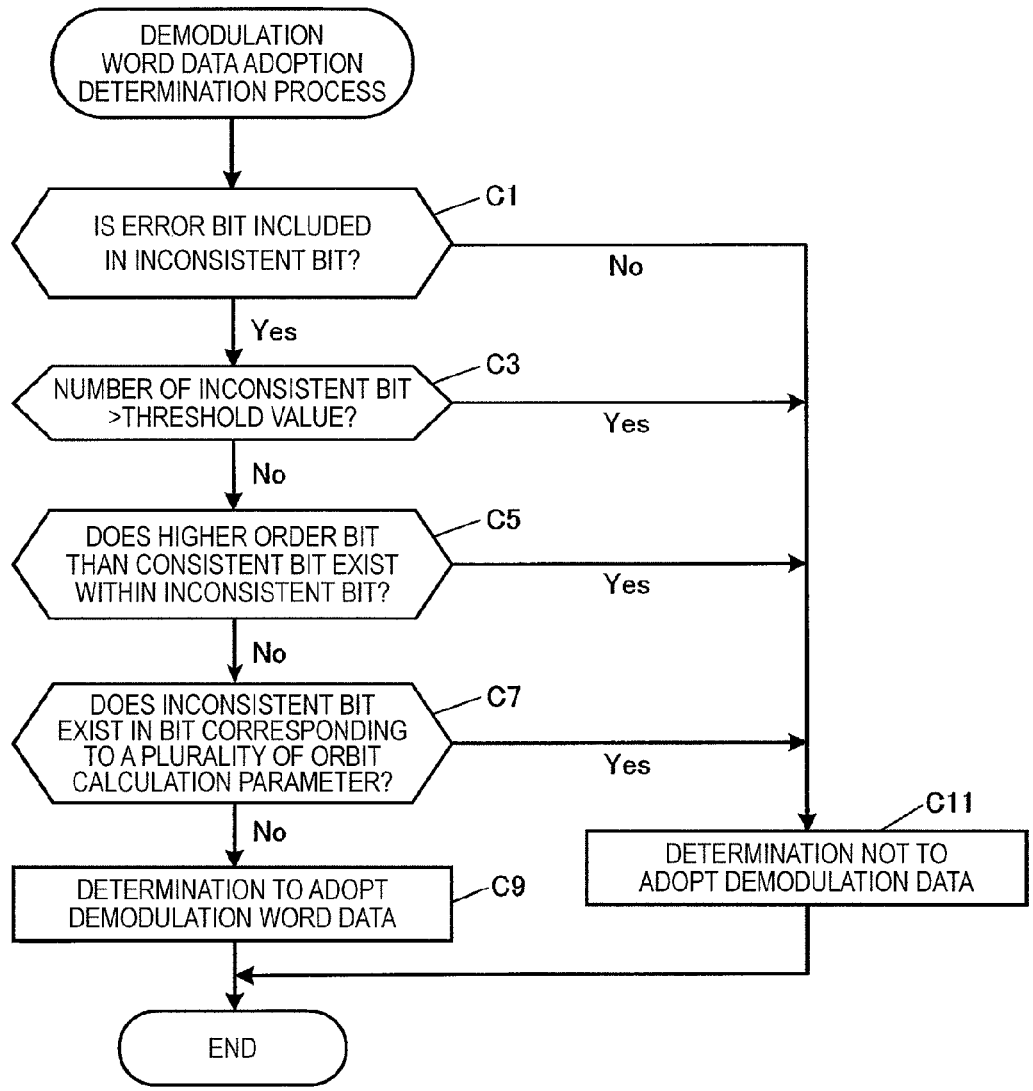
FIG. 7 is a flowchart illustrating a demodulated data adoption determination process flow.

FIG. 7 is a flowchart illustrating flow of the demodulated data adoption determination process.

Firstly, the adoption determination unit 216 determines whether or not the error bit is included in the inconsistent bit (Step C1). In a case where the error bit is not included in the inconsistent bit (Step C1; No), the adoption determination unit 216 determines not to adopt the demodulated word data (Step C11). Thereafter, the demodulated data adoption determination process is terminated.

On the other hand, in a case where the error bit is included in the inconsistent bit (Step C1; Yes), the adoption determination unit 216 determines whether or not the number of the inconsistent bit exceeds a predetermined threshold value (Step C3). In this case, the threshold value can be appropriately set, for example, the value may be set to "4 bits", as a threshold value. Then, in a case where it is determined to exceed the threshold value (Step C3; Yes), the step advances to step C11.

In a case where it is determined not to exceed the threshold value in the step C3 (Step C3; No), the adoption determination unit 216 determines whether or not a higher order bit than the matching bit which matches the error bit is present among the inconsistent bits (Step C5). Then, in a case where it is determined that the higher order bit is present (Step C5; Yes), the step advances to step C11. This corresponds to a determination that the word data is not to be adopted, in a case where the inconsistent bit in the highest order among the inconsistent bits, in the bit portion of the orbit calculation parameter within the word data, is not the error bit.

In step C5, in a case where it is determined that the higher bit does not exist (Step C5; No), the adoption determination unit 216 determines whether or not the inconsistent bit is present in the bits corresponding to a plurality of orbit calculation parameter (Step C7). Then, in a case where it is determined that the inconsistent bit is present (Step C7; Yes), the step advances to step C11. This corresponds to performing the adoption determination using the bit portion of each orbit calculation parameter, in a case where a plurality of orbit calculation parameter is included within the word data.

In step C7, in a case where it is determined that the inconsistent bit does not exist (Step C7; No), the adoption determination unit 216 determines to adopt the demodulation word data (Step C9). Then, the adoption determination unit 216 terminates the demodulation word data adoption determination process.

Returning back to the receiving process of FIG. 6, in a case where the determination result of the demodulated data adoption determination process is "ADOPTION" (Step B19: ADOPTION), the correction unit 217 corrects the demodulation word data (Step B21). Specifically, the value of the error bit which is detected by the error detection process is corrected. Then, after the corrected demodulation word data is stored as each item of the satellite final data 237 (Step B23), the process advances to the next word.

On the other hand, in a case where it is determined that the error bit cannot be detected in step B11 (Step B11; NG), in a case where it is determined that the word is not the orbit calculation parameter storing word in step B13 (Step B13; No), or in a case where it is determined that the adoption determination result is to be "NON-ADOPTION" (Step B19; NON-ADOPTION) in step B19, the process unit 21 advances to the process of the next word.

In step B7, in a case where the result of the parity check is "pass" (Step B7; PASS), the process unit 21 performs the demodulation word data validity determination process (Step B25). Specifically, in order to determine the validity of the demodulation word data which passes the parity check, the validity determination is performed using the comparison data.

Specifically, the validity determination determines whether or not value of the parameter stored in the demodulation word data and value of the parameter stored in the word data corresponding to each item of the satellite comparison data 235 satisfy a predetermined similarity condition. In detail, for example, the difference between the corresponding parameters is calculated using the demodulation word data and the comparison data. In a case where a plurality of parameters is stored, the difference between each of the parameters is calculated. Then, in a case where the absolute value of the difference is equal to or less than a predetermined threshold value, the demodulation word data is determined to be valid. On the other hand, in a case where the absolute value of the difference exceeds the threshold value, the demodulation word data is determined not to be valid.

If the demodulation word data is determined to be valid (Step B27; VALID), the process unit 21 allows the demodulated word data is stored as final data for each satellite 237 (Step B29). Then, the process unit 21 advances to the process for the next word. On the other hand, if the demodulation word data is determined not to be valid (Step B27; INVALID), the process unit 21 does not allow the demodulated word data to be stored, and advances to the process for the next word.

The processes of steps B5 to B29 as described above are performed for all of the words as processing objects (Step B31). Then, if the process of the loop B is performed for all of capture object satellites, the process unit 21 terminates the process of the loop A (Step B33). With this, the receiving process is completed.

Returning back to the baseband process of FIG. 5, after the receiving process is completed, the position calculation unit 219 performs the position calculation process (Step A13). Specifically, a position calculation known in the related art is performed using the navigation message demodulated for each of capture satellites or measurement information calculated for each of capture satellites to calculate the position of the mobile phone and the clock error. Then, the calculated result data is stored in the storage unit 23 as the calculated result data 238.

Next, the process unit 21 determines whether or not to terminate the process (Step A15); if the process unit 21 determines to continue the process (Step A15; No), the step returns to step A1. Further, in a case where it is determined to terminate the process (Step A15; Yes), the baseband process is terminated.

3. Specific Example

FIGS. 8A to 8E are diagrams illustrating specific example of the demodulated data adoption determination according to the present embodiment. An explanation is described with respect to the adoption determination of the demodulated word data, with reference to an example of the complex word including two orbit calculation parameters of the parameter A and the parameter B.

In FIGS. 8A to 8E, the 24 bits configuring the complex word are referred to as B1 to B24. The bits corresponding to the parameter A are 16 bits of B1 to B16 and the bits corresponding to the parameter B are eight bits of B17 to B24. In addition, the error bits and the inconsistent bits are shown in each column of the parameter A and the parameter B. Here, it is explained that the error bit is B5. Further, it is explained that the threshold value for the number of the inconsistent bit is "4 bits".

In an example of FIG. 8A, the inconsistent bits are "B5" and "B13". In this case, since the error bit is included in the inconsistent bit, the step C1 in FIG. 7 becomes Yes. Further, all of the steps C3 to C7 in FIG. 7 become No. As a result, the demodulation word data is determined to be "ADOPTION" (Step C9 in FIG. 7).

In an example of FIG. 8B, the inconsistent bits are "B7" and "B13". In this case, since the error bit is not included in the inconsistent bit, the step C1 in FIG. 7 becomes No. As a result, the demodulation word data is determined to be "NO ADOPTION" (Step C11 in FIG. 7).

In an example of FIG. 8C, the inconsistent bits are "B5", "B7", "B10", "B13" and "B16". In this case, the step C1 in FIG. 7 becomes Yes, but since the number of the inconsistent bit (5 bits) exceeds the threshold value (4 bits), the step C3 in FIG. 7 becomes Yes. As a result, the demodulation word data is determined to be "NON-ADOPTION" (Step C11 in FIG. 7).

In an example of FIG. 8D, the inconsistent bits are "B3", "B5" and "B13". In this case, the step C1 in FIG. 7 becomes Yes, and the step C3 becomes No. However, the inconsistent bit "B3" is present in the higher order bit than the common bit "B5" which is the error bit and the inconsistent bit at the same time. Because of that, the step C5 in FIG. 7 becomes Yes. As a result, the demodulation word data is determined to be "NON-ADOPTION" (Step C11 in FIG. 7).

In an example of FIG. 8E, the inconsistent bits are "B5", "B13" and "B20". In this case, the step C1 in FIG. 7 becomes Yes, and the steps C3 and C5 become No. However, the inconsistent bits exist in the bit corresponding to the parameter A and the bit corresponding to the parameter B. Because of that, the step C7 in FIG. 7 becomes Yes. As a result, the demodulation word data is determined to be "NON-ADOPTION" (Step C11 in FIG. 7).

4. Operational Effect

In the baseband process circuit unit 20, the demodulation unit 213 demodulates the signal which is received, that is, the GPS satellite signal which carries the navigation message therewith. Further, the error bit detection unit 214 detects the error bit from among the demodulated data using the parity bit included in the demodulated data. On the other hand, the inconsistent bit detection unit 215 detects the inconsistent bit, comparing the demodulated data with prescribed comparison data. The adoption determination unit 216 determines whether or not to adopt the demodulated data, based on the difference and similarity of the error bit and the inconsistent bit. Then, the correction unit 217 corrects the demodulated data in a case where the determined data is determined to be adopted by the adoption determination unit 216.

In an environment with a weak electric field and the like, the demodulation of the receiving signal is not performed correctly. Accordingly, it is highly possible to discard the demodulated data. However, for example, if the demodulation error occurs in 1 bit, the error bit is detected and specified, and the demodulated data is corrected. Thereby, the demodulated data can be used to calculate the position. Then, it is determined whether or not to adopt the demodulated data, based on the difference and similarity between the error bit detected by the error bit detection process and the inconsistent bit detected by the inconsistent bit detection process. Then, in a case where it is determined to be adopted, the demodulated data is corrected. Thereby, after the appropriate determination whether or not to adopt the demodulated data, the received data in which the demodulation error occurs can be restored to be used for the position calculation.

Further, in the present embodiment, the error bit is detected for each demodulated data (demodulated word data) by the word unit which is a predetermined transport data unit, following a data format of the navigation message. As an important parameter included in the navigation message, there is an orbit calculation parameter used to calculate the satellite orbit. With the word in which the orbit calculation parameter is stored as an object, the demodulation word data is compared with the comparison data. Then, the determination whether or not to adopt the demodulation word data is made, based on the comparison result.

Further, in the present embodiment, by acquiring the long term prediction ephemeris 234 from the server and by using the long term prediction ephemeris 234, the comparison data is generated. At this time, by using the data of the prediction ephemerides for each of GPS satellites which is stored in the long term prediction ephemeris 234, the comparison data is generated for each GPS satellite. Thereby, the comparison data which is appropriate to compare with the demodulated data can be generated by a simple configuration.

5. Modification Example

The embodiment to which the invention is applicable is not limited thereto, it is also possible to appropriately modify within the scope which is not depart from the spirit of the invention. Hereinafter, the modification will be described.
5-1. Error bit Detection In the above-mentioned embodiment, by using the parity bit which is a kind of error detection code, examples of a case detecting the 1 error bit are described. However, it is preferable that the configuration detects the error bits using an error detection code other than the parity bit and may be configured to detect 2 or more error bits.
5-2. Comparison Object In the above embodiment, with assuming the word in which the orbit calculation parameter is stored as an object, descriptions are given which the detection of the inconsistent bit and the adoption determination of the demodulated data are performed. This is to show an example of the word suitable for performing the adoption determination of the demodulated data, but if the word is a word in which the consistent parameter value is stored in the prediction ephemeris and the long term prediction ephemeris, the word can be an object of the detection of the inconsistent bit and the adoption determination of the demodulated data.
5-3. Adoption Determination Method The determination condition associated with the adoption of the demodulated data which is described in the steps C1 to C7 of the demodulated data adoption determination process is only an example and can be appropriately set. For example, in the orbit calculation parameter storing word, if the error bit and the inconsistent bit are consistent each other in the bit portion which corresponds to the higher order digit of the orbit calculation parameter, even though the error bit and the inconsistent bit are different from each other in the bit portion which corresponds to the lower order digit, the demodulation word data may be determined to be adopted. This corresponds to the determination that the word data is to be adopted if the error bit and the inconsistent bit are consistent each other in the prescribed determination bit portion in the bit portion of the orbit calculation parameter within the word data even when the error bit and the inconsistent bit are different from each other in the bit determination portion.

Further, how many digits (how many bits) are defined as the higher order digit and the lower order digit is an option. For example, if the parameters for the calculation of the orbit are represented by 16 bits, the higher order digit and the lower order digit may be 8 bits each, respectively, and the higher order digit may be defined as 6 bits and the lower order digit may be defined as 10 bits.

Further, according to the orbit calculation parameters which is stored in the word data, by changing the determination condition associated with the adoption or non-adoption of the word data, the determination may be performed. For example, in the demodulation word data related to a single word in which one type of orbit calculation parameter is stored, if the error bit and the inconsistent bit are consistent in the bit portion which corresponds to the higher order digit, even though many inconsistent bits are detected in the bit portion which corresponds to the lower order digit, the demodulated data word is determined to be adopted.

In contrast, in the demodulation word data related to a complex word in which two types of the orbit calculation parameters are stored, even though the error bit and the inconsistent bit are consistent in the bit portion which corresponds to the higher order digit, in a case where even 1 inconsistent bit is present in the bit portion of the parameter in the lower order side, the demodulated data word is determined not to be adopted.
5-4. Comparison Data In the above embodiment, a case where the comparison data is generated using the long term prediction ephemeris 234 is described as an example. However, the generation method of the comparison data is not limited thereto. For example, the received signal of the GPS satellite signal is demodulated, and then by using the prediction ephemeris acquired thereby, the comparison data may be generated.
5-5. Electronic Equipment In the above embodiment, a case is described in which the invention is adopted in a mobile phone which is a kind of electronic equipment as an example. However, the electronic equipment capable of being adopted in the invention is not limited thereto. For example, the invention can be adopted in other similar electronic devices such as a car navigation device, a portable navigation device, a personal computer, PDA (Personal Digital Assistant), and a wristwatch.

5-6. Subject of Process

In the above embodiment, an example is described in which the process unit 21 in the baseband process circuit unit 20 performs all of the demodulation of the received signal, the error bit detection, the inconsistent bit detection, the adoption determination, and correction. However, a portion or all of these processes may be performed by the host process unit 30 of the electronic device. In addition, the processes can be shared by the baseband process circuit 20 and the host process unit 30 in such a manner that the demodulation of the received signal, the error bit detection and the inconsistent bit detection may be performed by the process unit 21 in the baseband process circuit unit 20 and the adoption determination process and the correction process may be performed by the host process unit 30 in the electronic device.

5-7. Satellite Position Measurement System

Further, in the above embodiment, an example is described in which the GPS is used as the satellite position measurement system, but other satellite positioning systems such as WAAS (Wide Area Augmentation System), QZSS (Quasi Zenith Satellite System), GLONASS (Global Navigation Satellite System), and GALILEO may be used.

What is claimed is:

1. A receiving method comprising:
    receiving a satellite signal which carries a navigation message;
    demodulating the received satellite signal to obtain a demodulated data;
    detecting an error bit position in the demodulated data using an error detection code included in the demodulated data;
    detecting one or more inconsistent bit positions in the demodulated data by comparing the demodulated data with prescribed comparison data;
    determining whether or not to adopt the demodulated data, based on a difference between the error bit position and the one or more inconsistent bit positions; and
    correcting the demodulated data, in a case where the demodulated data is determined to be adopted by the determination.

2. The receiving method according to claim 1,
    wherein the demodulated data comprises word data for each predetermined transport data unit, following a data format of the navigation message,
    wherein the detecting of the error bit position includes detecting the error bit position for each word data,
    the detecting of the one or more inconsistent bit positions includes comparing the demodulated data with the comparison data with respect to word data in which an orbit calculation parameter is stored, and
    the determining whether or, not to adopt the demodulated data includes determining whether or not to adopt the word data in which the orbit calculation parameter is stored.

3. The receiving method according to claim 2,
    wherein the determining whether or not to adopt the demodulated data includes determining to adopt the word data in a bit portion of the orbit calculation parameter within the word data, if the error bit position and the one or more inconsistent bit positions in a prescribed determination bit portion are consistent, even in a case where the error bit and the one or more inconsistent bit positions are different in a bit portion other than the determination bit portion.

4. The receiving method according to claim 2,
    wherein the determining whether or not to adopt the demodulated data includes determining not to adopt the word data in a case where the highest order inconsistent bit position among the one or more inconsistent bit positions is not the error bit position in a bit portion of the orbit calculation parameter within the word data.

5. The receiving method according to claim 3,
    wherein the determining whether or not to adopt the demodulated data includes performing determination using a bit portion of each orbit calculation parameter, in a case where a plurality of orbit calculation parameters is included in the word data.

6. The receiving method according to claim 2,
    wherein the determining whether or not to adopt the demodulated data includes performing determination by changing conditions of determining whether or not to adopt the word data, depending on the orbit calculation parameter which is stored in the word data.

7. The receiving method according to claim 1, further comprising:
    generating the comparison data using a long term prediction ephemeris.

8. A receiving apparatus comprising:
    a receiving unit that receives a satellite signal which carries a navigation message;
    a demodulation unit that demodulates the received satellite signal to obtain a demodulated data;
    an error bit detection unit that detects an error bit position in the demodulated data using an error detection code included in the demodulated data;
    an inconsistent bit detection unit that detects one or more inconsistent bit positions in the demodulated data by comparing the demodulated data with prescribed comparison data;
    an adoption determination unit that determines whether or not to adopt the demodulated data, based on a difference between the error bit position and the one or more inconsistent bit positions; and
    a correction unit that corrects the demodulated data, in a case where the demodulated data is determined to be adopted by the adoption determination unit.

* * * * *